United States Patent
Oyabu

(10) Patent No.: US 10,313,944 B2
(45) Date of Patent: Jun. 4, 2019

(54) RELAY STATION AND CONTROL METHOD THEREOF

(71) Applicant: KYOCERA CORPORATION, Kyoto (JP)

(72) Inventor: Takahiro Oyabu, Hachio-ji (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 15/348,275

(22) Filed: Nov. 10, 2016

(65) Prior Publication Data
US 2017/0142625 A1    May 18, 2017

(30) Foreign Application Priority Data
Nov. 13, 2015   (JP) ................................ 2015-223392

(51) Int. Cl.
| | | |
|---|---|---|
| H04B 7/14 | (2006.01) | |
| H04W 36/18 | (2009.01) | |
| H04W 36/06 | (2009.01) | |
| H04W 40/22 | (2009.01) | |
| H04W 36/00 | (2009.01) | |
| H04W 84/00 | (2009.01) | |
| H04W 84/04 | (2009.01) | |

(52) U.S. Cl.
CPC ....... *H04W 36/18* (2013.01); *H04W 36/0055* (2013.01); *H04W 36/06* (2013.01); *H04W 40/22* (2013.01); *H04W 36/0009* (2018.08); *H04W 84/005* (2013.01); *H04W 84/047* (2013.01)

(58) Field of Classification Search
CPC ...... H04W 36/18; H04W 36/06; H04W 40/22
See application file for complete search history.

(56) References Cited

U.S. PATENT DOCUMENTS

| | | | |
|---|---|---|---|
| 2013/0017776 A1* | 1/2013 | Takano | H04B 7/155 455/7 |
| 2013/0115953 A1* | 5/2013 | Fukuta | H04B 7/155 455/436 |

(Continued)

FOREIGN PATENT DOCUMENTS

| | | |
|---|---|---|
| JP | H10-164640 A | 6/1998 |
| JP | 2000-229571 A | 8/2000 |

(Continued)

OTHER PUBLICATIONS

3rd Generation Partnership Project; Technical Specification Group Radio Access Network; Evolved Universal Terrestrial Radio Access (E-UTRA); Study on mobile relay (Release 12); 3GPP TR 36.836; V12.0.0; Jun. 2014; pp. 13-16; 3GPP Organizational Partners.

*Primary Examiner* — Abdelnabi O Musa
(74) *Attorney, Agent, or Firm* — Studebaker & Brackett PC

(57) ABSTRACT

A relay station relays communication between a base station and a wireless terminal, and the relay station includes: a first wireless unit, a second wireless unit and a third wireless unit, each of which communicates with at least one of the base station and the wireless terminal, wherein when the first wireless unit is connected to the wireless terminal and the second wireless unit is connected to the base station and when there is a trigger of handover, the third wireless unit is used to execute at least one of handover to another base station and handover to switch a control channel with the wireless terminal.

9 Claims, 5 Drawing Sheets

(56) References Cited

U.S. PATENT DOCUMENTS

| | | | | |
|---|---|---|---|---|
| 2013/0122908 A1* | 5/2013 | Zhao | ............... | H04W 36/08 |
| | | | | 455/436 |
| 2013/0195005 A1 | 8/2013 | Al-Shalash | | |
| 2013/0244569 A1* | 9/2013 | Dunn | ............... | H04W 36/0061 |
| | | | | 455/11.1 |
| 2013/0250773 A1* | 9/2013 | Ohta | ............... | H04B 7/155 |
| | | | | 370/241 |
| 2015/0195757 A1* | 7/2015 | Tietz | ............... | H04W 36/0061 |
| | | | | 455/438 |

FOREIGN PATENT DOCUMENTS

| | | |
|---|---|---|
| JP | 2010-081435 A | 4/2010 |
| JP | 2014-212372 A | 11/2014 |

* cited by examiner

RELAY STATION AND CONTROL METHOD THEREOF

CROSS-REFERENCE TO RELATED APPLICATION

This application claims priority from Japanese Patent Application No. 2015-223392 filed on Nov. 13, 2015, the entire subject matter of which is incorporated herein by reference.

TECHNICAL FIELD

This disclosure relates to a relay station relaying communication between a base station and a wireless terminal and a method of controlling the relay station.

BACKGROUND

Recently, in order to provide stable services to smartphones or wireless devices (wireless terminals), installation of relay stations relaying communication between base stations and wireless terminals is in progress. Accordingly, it is possible to reduce ranges in which wireless terminals may not communicate with base stations due to influences of shadowing by obstacles such as buildings despite service zones.

Relay stations are not limited to relay stations installed to be fixed on buildings or towers, but can also be mounted on moving objects such as automobiles or trains on which people can get (for example, JP-A-2010-81435). Relay stations mounted on moving objects can maintain relative positional relations with wireless terminals and can communicate with base stations without adverse effects. Therefore, wireless terminals in moving objects can ensure stable communication.

SUMMARY

This disclosure is to provide a relay station and a control method of controlling the relay station, which are capable of improving stability and comfort of communication service by avoiding occurrence of communication disconnection at a time when handover is executed.

A relay station according to this disclosure relays communication between a base station and a wireless terminal, and the relay station includes: a first wireless unit, a second wireless unit and a third wireless unit, each of which communicates with at least one of the base station and the wireless terminal, wherein when the first wireless unit is connected to the wireless terminal and the second wireless unit is connected to the base station and when there is a trigger of handover, the third wireless unit is used to execute at least one of handover to another base station and handover to switch a control channel with the wireless terminal.

In the above relay station, the handover may be executed based on at least one of a position and a time.

In the above relay station, when there is no trigger of the handover and the handover by the third wireless unit is not executed, the third wireless unit may be connected to the base station to transmit and receive information which is identical with information that is transmitted and received by the second wireless unit.

In the above relay station, when there is no trigger of the handover and the handover by the third wireless unit is not executed, the third wireless unit may be connected to the base station to transmit and receive information which is different from information that is transmitted and received by the second wireless unit In the above relay station, when there is no trigger of the handover and the handover by the third wireless unit is not executed, the third wireless unit may be connected to another wireless terminal.

According to this disclosure, it is possible to provide a relay station and a control method of the relay station, which are capable of improving stability and comfort of communication service by avoiding occurrence of communication disconnection at a time when handover is executed.

BRIEF DESCRIPTION OF THE DRAWINGS

The foregoing and additional features and characteristics of this disclosure will become more apparent from the following detailed descriptions considered with the reference to the accompanying drawings, wherein.

DETAILED DESCRIPTION

Figure 1:
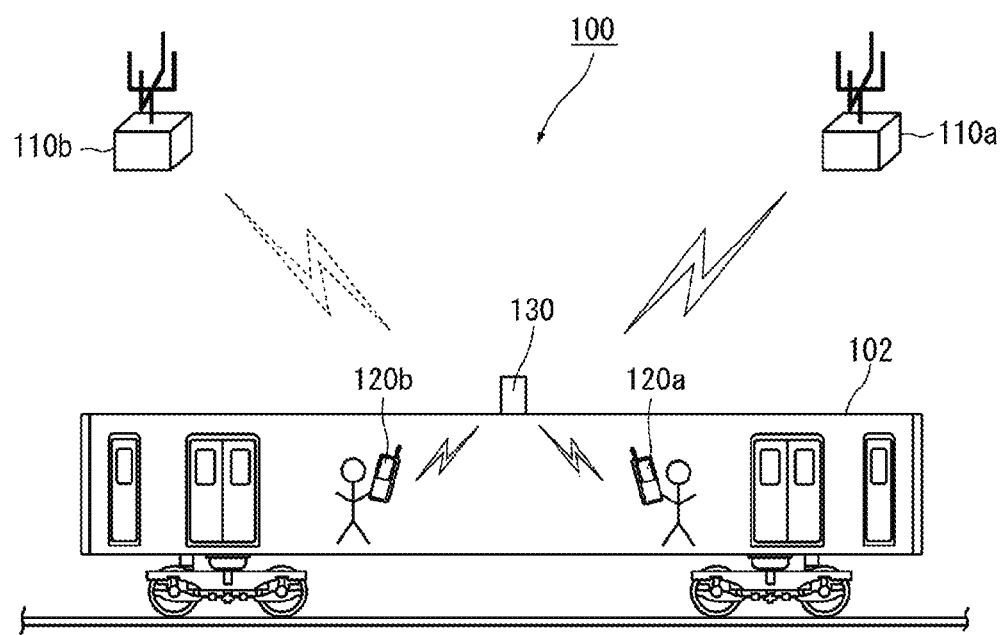
FIG. 1 is a diagram illustrating a communication system including a relay station according to an embodiment.

Hereinafter, a preferred embodiment of this disclosure will be described in detail with reference to the appended drawings. The sizes, materials, other specific numerical values described in the embodiment are merely examples to facilitate the understanding of this disclosure and this disclosure is not limited thereto unless otherwise stated. Throughout the present specification and the drawings, the same reference numerals are given to elements having substantially the same functions and configurations, the repeated description thereof is omitted, and elements directly unrelated to this disclosure are not illustrated.

FIG. 1 is a diagram illustrating a communication system 100 including a relay station 130, according to this embodiment. As illustrated in FIG. 1, the communication system 100 includes base stations 110*a* and 110*b* and terminals 120*a* and 120*b* (wireless terminals), and a relay station 130. In the embodiment, the relay station 130 is mounted on a moving object 102 such as a vehicle and relays communication between the base station 110*a* and the terminal 120*a* in the moving object 102.

Figure 2:
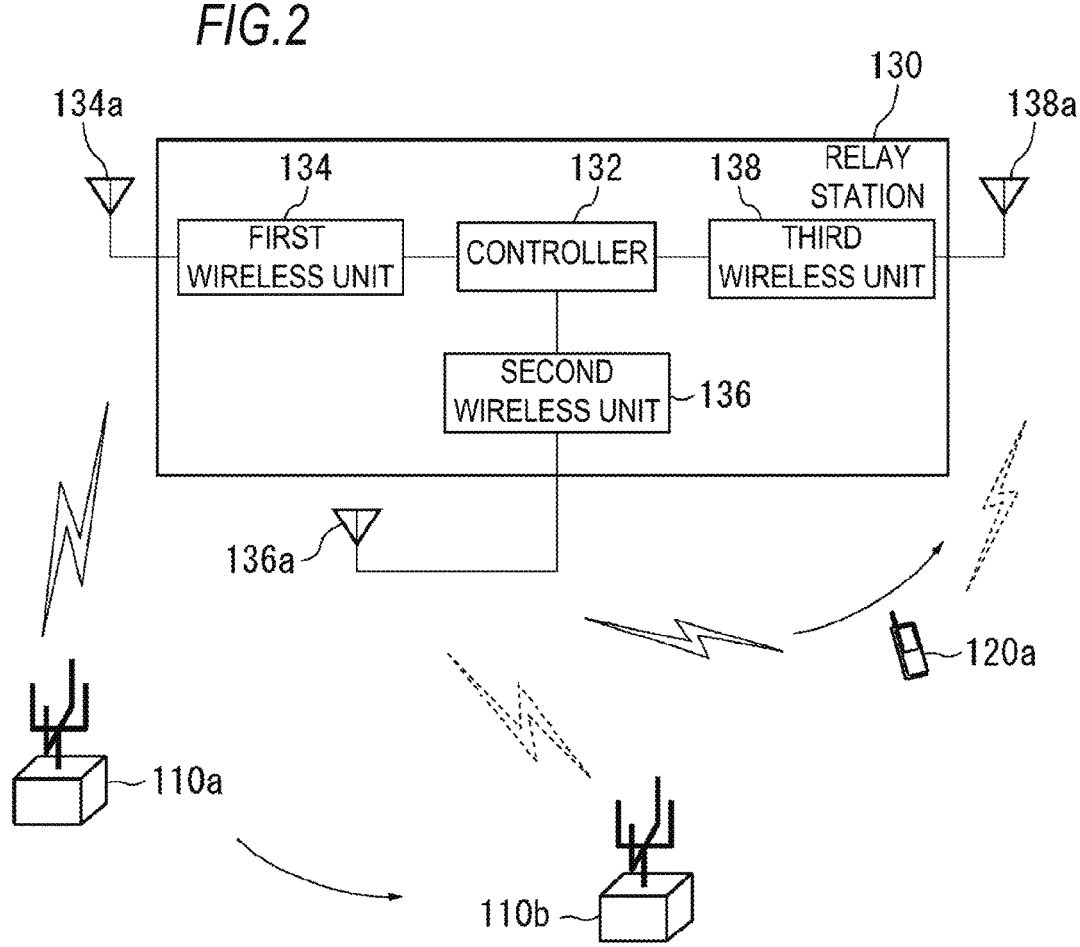
FIG. 2 is a functional block diagram illustrating a schematic configuration of the relay station, according to this embodiment.

FIG. 2 is a functional block diagram illustrating a schematic configuration of the relay station 130, according to this embodiment. As illustrated in FIG. 2, the relay station 130 according to this embodiment is configured to include a controller 132 and three wireless units (a first wireless unit 134, a second wireless unit 136, and a third wireless unit 138). The controller 132 is configured by a semiconductor integrated circuit (not illustrated) including a central processing unit (CPU), and manages and controls the entire relay station 130.

The first wireless unit 134, the second wireless unit 136, and the third wireless unit 138 execute communication with the base stations 110*a* and 110*b* or the terminals 120*a* and 120b. As illustrated in FIG. 2, the first wireless unit 134, the second wireless unit 136, and the third wireless unit 138 are connected to antennas 134a, 136a, and 138a, respectively, and execute transmission and reception (communication) of signals via the antennas 134a to 138a.

Figure 3:
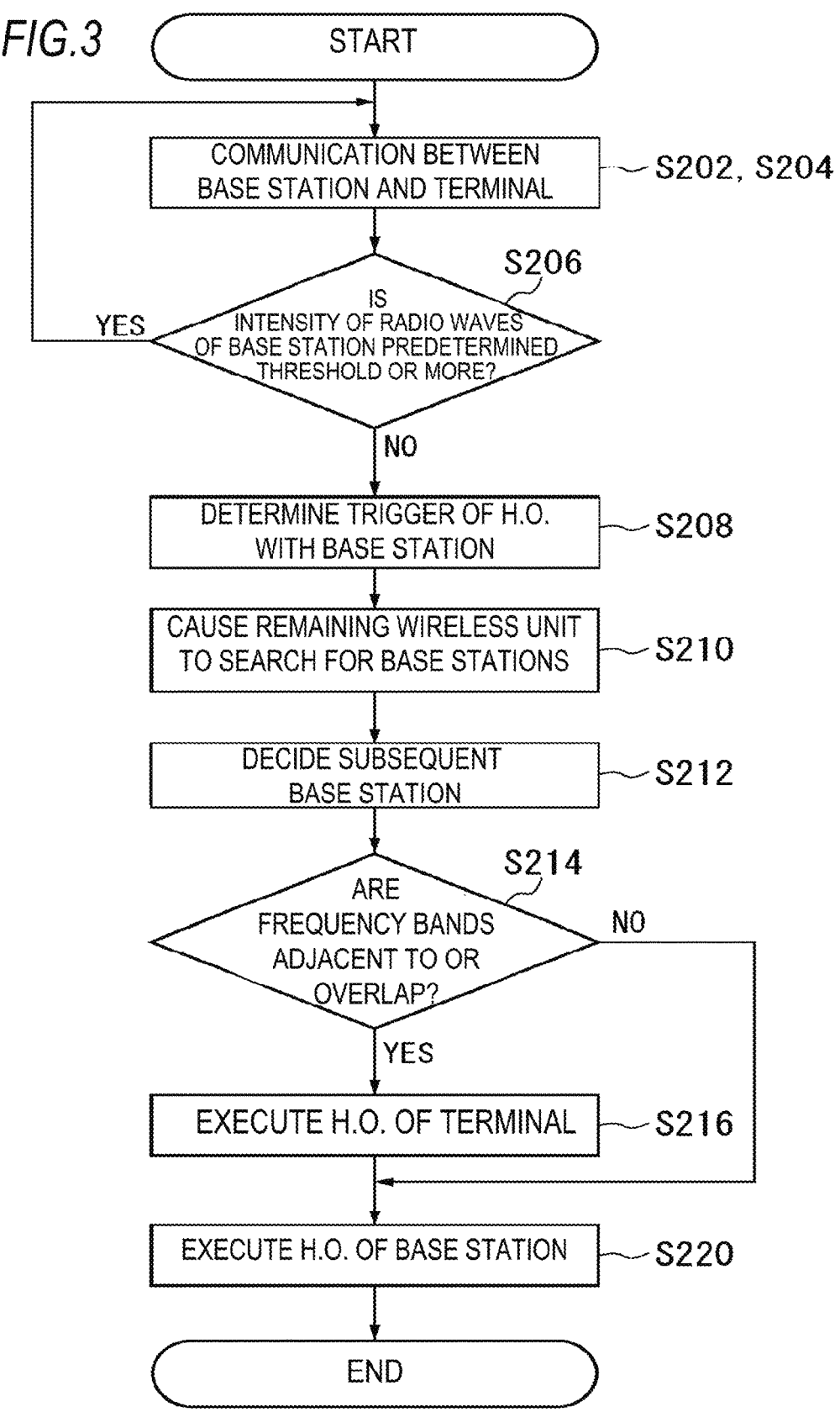
FIG. 3 is a flowchart illustrating an operation of the relay station according to this embodiment.
Figure 4:
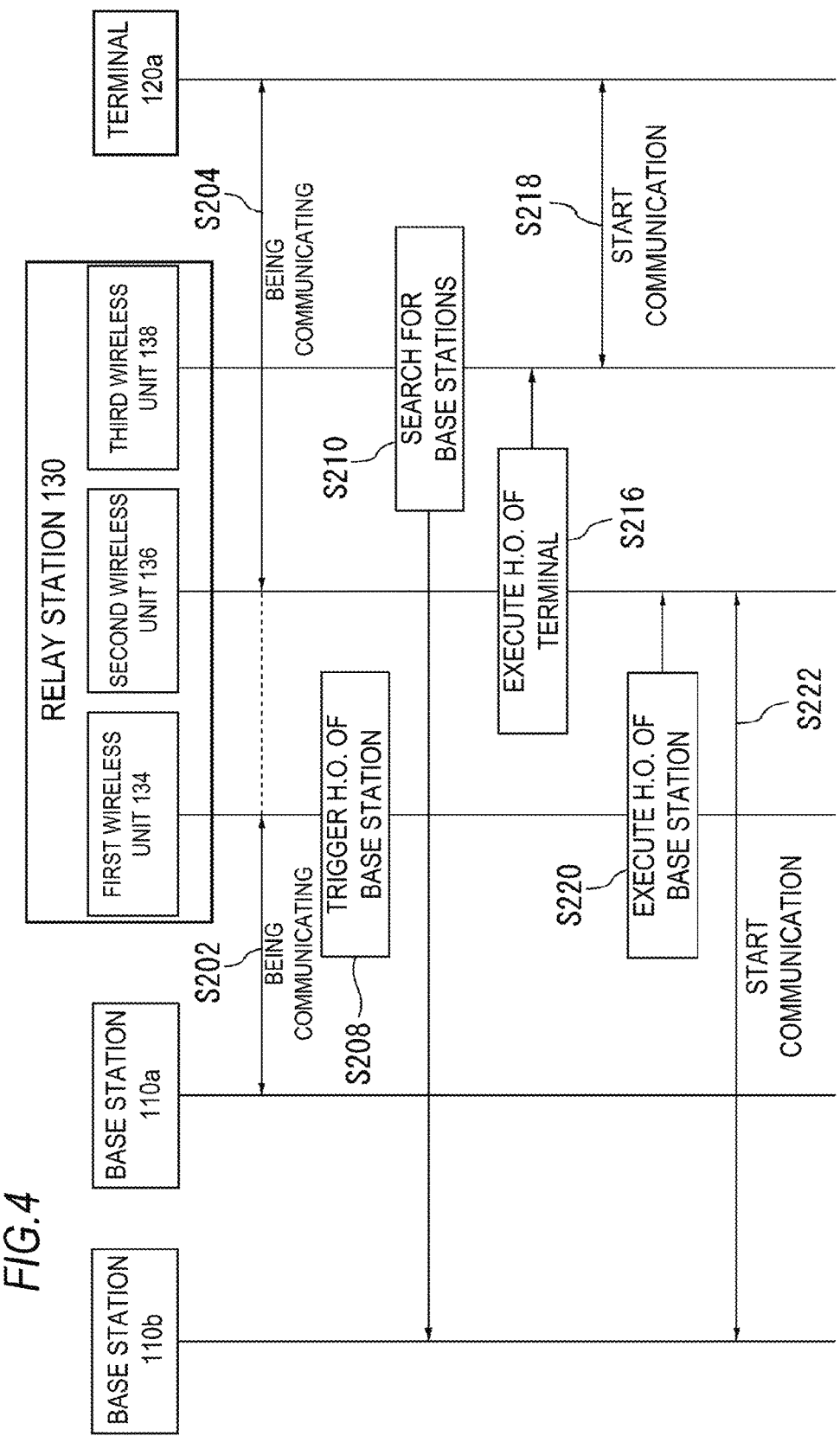
FIG. 4 is a sequence diagram illustrating an operation of the relay station, according to this embodiment.

FIG. 3 is a flowchart illustrating an operation of the relay station 130, according to this embodiment. FIG. 4 is a sequence diagram illustrating an operation of the relay station 130, according to this embodiment. In FIGS. 3 and 4, the same reference numerals are given to the same operations of the relay station 130.

As illustrated in FIG. 4, among the three wireless units, the first wireless unit 134 communicates with the base station 110a (step S202) and the second wireless unit 136 communicates with the terminal 120a (step S204) in the relay station 130, according to this embodiment. Accordingly, the base station 110a and the terminal 120a are communicating with each other via the relay station 130.

During the communication between the base station 110a and the terminal 120a, the controller 132 of the relay station 130 monitors whether radio wave intensity from the base station 110a is equal to or greater than a predetermined threshold (step S206). When the radio wave intensity received in the first wireless unit 134 from the base station 110a is less than the predetermined threshold (NO in step S206), the controller 132 determines the fact that the radio wave intensity is less than the predetermined threshold as a trigger to execute base station handover (H. O.) (step S208). RSSI or SINR can be exemplified as the radio wave intensity.

In the embodiment, the radio wave intensity of the base station 110a has been exemplified as a trigger of handover, but this disclosure is not limited thereto. For example, the controller 132 may determine execution of handover based on the position or time of the relay station 130. When the moving object 102 on which the relay station 130 is mounted is a train or a bus, the time or position of the moving object 102 can be roughly ascertained. Accordingly, since a positional relation with the base station 110a at a predetermined position or time can be determined, handover can be executed based on such information.

If it is determined to execute the handover as described above, the controller 132 causes the wireless unit that is not executing communication with the base station 110a and the terminal 120a, that is, the third wireless unit 138 which is the remaining wireless unit, to search for base stations (step S210). Accordingly, the controller 132 decides a base station with which communication is subsequently executed (in the embodiment, the base station 110b is exemplified) (step S212).

When i the base station with which communication is subsequently executed is decided, the controller 132 determines whether a frequency band (a frequency band of a base station side) that is subsequently used for communication with the base station 110b is adjacent to or overlaps a frequency band (a frequency band of a terminal side) that is currently used for communication with the terminal 120a by the first wireless unit 134 (step S214). Although not illustrated in the sequence diagram of FIG. 3, when the frequency band used for the communication with the terminal 120a by the first wireless unit 134 is not adjacent to or does not overlap the frequency band of the base station 110b with which communication is subsequently executed (NO in step S214), the controller 132 of the relay station 130 cause the third wireless unit 138 which is the remaining wireless unit to execute seamless handover so that the third wireless unit 138 communicates with the base station 110b.

The seamless handover is handover in which a time slot is switched while establishing connection with both of a time slot of a movement source and a time slot of a movement destination when communication is executed by time-division multiplexing. Meanwhile, the seamless handover is handover in which a resource block is switched while establishing connection with both of a resource block of a movement source and a resource block of a movement destination when communication is executed by LTE.

On the other hand, when the frequency band being currently used for the communication with the terminal 120a by the first wireless unit 134 is adjacent to or overlaps the frequency band of the base station 110b with which communication is subsequently executed (YES in step S214), the controller 132 of the relay station 130 uses the remaining wireless unit, that is, the third wireless unit 138, which is not executing communication, to execute seamless handover (H. O. of the terminal) in which a control channel with the terminal 120a is switched (step S216).

Specifically, as illustrated in FIG. 4, the controller 132 of the relay station 130 switches the communication with the terminal 120a from the second wireless unit 136 to the third wireless unit 138. Accordingly, it is possible to switch the control channel at the time of communication, that is, the frequency band, without occurrence of disconnection of the communication with the terminal 120a. Then, since the terminal 120a and the third wireless unit 138 execute communication (step S218), and the second wireless unit 136 becomes a "remaining wireless unit", which is not executing communication with any of the base stations 110a and 110b and the terminal 120a.

Subsequently, as illustrated in FIG. 3, the controller 132 of the relay station 130 uses the second wireless unit 136, which is the remaining wireless unit in the handover of step S216, to execute seamless handover (H. O. of the base station) to the base station 110b (another base station) (step S220). Specifically, the controller 132 of the relay station 130 causes the second wireless unit 136 to establish communication with the base station 110b, and subsequently causes the first wireless unit 134 to disconnect the communication with the base station 110a. Accordingly, as illustrated in FIG. 4, communication between the base station 110b and the second wireless unit 136 starts (step S222). Thus, it is possible to execute handover between the base stations without occurrence of disconnection of the communication.

In the relay station 130 according to this embodiment, as described above, the wireless unit, which is not executing communication with any of the base station and the terminal among the three wireless units, can be used for both of the handover between the base stations and the handover in which the control channel of the terminal is switched. Accordingly, it is possible to realize the seamless handover of both of the base station and the terminal, and thus it is possible to avoid the occurrence of the disconnection of the communication at a time when the handover with the base station or the terminal is executed. Thus, it is possible to improve stability and comfort of communication service.

Figure 5A:
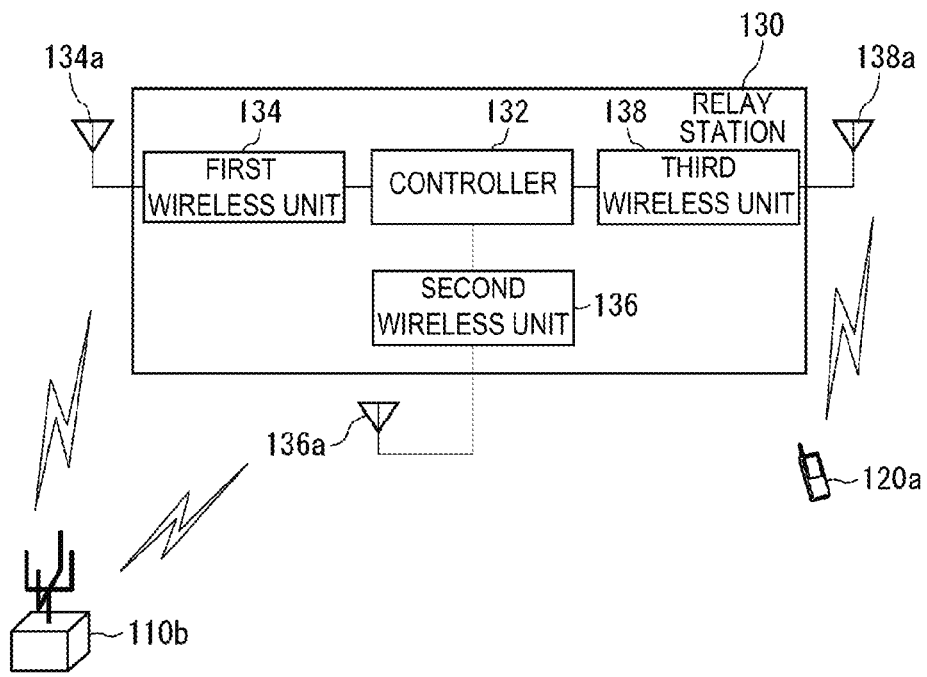
FIGS. 5A and 5B are diagrams illustrating connection examples between the relay station and each of a base station and a wireless terminal, according to this embodiment.
Figure 5B:
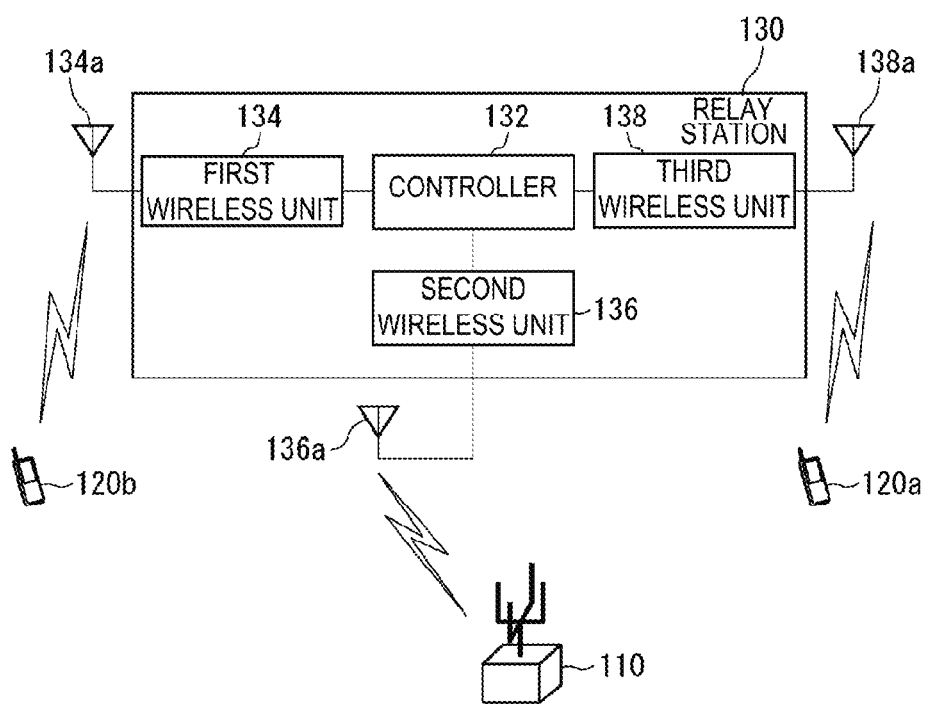

FIGS. 5A and 5B are diagrams illustrating connection examples between the relay station 130 and each of a base station and a terminal, according to this embodiment. As illustrated with reference to FIGS. 3 and 4, after the handover of the terminal 120a and the handover between the base stations are executed, the third wireless unit 138 in the relay station 130 communicates with the terminal 120a and the second wireless unit 136 communicates with the base station 110b. Therefore, the communication unit which does not communicate with the base station 110b and the terminal 120a is the first wireless unit 134. Thus, in FIGS. 5A and 5B and the following description, a case in which the first wireless unit 134 is a remaining wireless unit is assumed.

In FIG. 5A, the remaining first wireless unit 134 is connected to the base station 110b at a time when handover with the base station or the terminal is not executed. At this time, by transmitting and receiving identical information in the base station 110b and the two wireless units (the first wireless unit 134 and the second wireless unit 136), it is possible to suppress occurrence of an error in data transmission and reception. At this time, when another information is transmitted and received in the base station 110b and the two wireless units (the first wireless unit 134 and the second wireless unit 136), it is possible to achieve high speed of communication.

In FIG. 5B, the remaining first wireless unit 134 is connected to another terminal 120b at a time when handover with the base station or the terminal is not executed. In such a configuration, it is possible to increase the number of accommodation lines, and thus it is possible to expand communication resources.

That is, the remaining first wireless unit 134 is used for communication with the base station 110b in the configuration of FIG. 5A, and the remaining first wireless unit 134 is used for communication with the other terminal 120b in the configuration of FIG. 5B. In this way, whether to use the remaining wireless unit for the base station side or the terminal side is preferably allocated to the side on which the communication speed is slow.

The preferred embodiment of this disclosure has been described above with reference to the appended drawings, but it is regardless to say that this disclosure is not limited to related examples. It is apparent to those skilled in the art that various modifications or corrections can be achieved within the scope described in the claims and it is, of course, construed that the modifications and corrections belong to the technical ranges of this disclosure.

The steps in the wireless communication relay method according to the disclosure may not necessarily be processed chronologically in the order described in the flowchart or the sequence diagram and may include processes executed in parallel or in subroutines.

This disclosure is applicable to a relay station relaying communication between a base station and a wireless terminal and a method of controlling the relay station.

What is claimed is:

1. A relay station relaying communication between a base station and a wireless terminal, the relay station comprising:
a controller including a central processing unit that manages and controls the relay station; and
a first wireless unit, a second wireless unit and a third wireless unit, each of which is in communication with the controller and communicates with at least one of the base station and the wireless terminal,
wherein when the first wireless unit is connected to the wireless terminal and the second wireless unit is connected to the base station and when there is a trigger of handover, as determined by the controller based on one of a condition of a signal from the base station and a condition pertaining to the relay station, wherein the condition of the signal from the base station is comparing an intensity of the signal with a predetermined threshold for triggering the handover, the third wireless unit communicates with other base stations to execute at least one of handover of the second wireless unit from the connected base station to one of the communicated base stations and handover to switch a control channel with the wireless terminal.

2. The relay station according to claim 1,
wherein the handover is executed based on the condition pertaining to the relay station indicating at least one of a position and a time.

3. The relay station according to claim 1,
wherein when there is no trigger of the handover and the handover by the third wireless unit is not executed, the third wireless unit is connected to the base station to transmit and receive information which is identical with information that is transmitted and received by the second wireless unit.

4. The relay station according to claim 1,
wherein when there is no trigger of the handover and the handover by the third wireless unit is not executed, the third wireless unit is connected to the base station to transmit and receive information which is different from information that is transmitted and received by the second wireless unit.

5. The relay station according to claim 1,
wherein when there is no trigger of the handover and the handover by the third wireless unit is not executed, the third wireless unit is connected to another wireless terminal.

6. A control method of a relay station including a first wireless unit, a second wireless unit and a third wireless unit, each of which communicates with at least one of the base station and the wireless terminal, the method comprising:
managing and controlling the relay station by a controller including a central processing unit; and
executing, when the first wireless unit is connected to the wireless terminal and the second wireless unit is connected to the base station, by the third wireless unit that communicates with other base stations, at least one of handover of the second wireless unit from the connected base station to one of the communicated base stations and handover to switch a control channel with the wireless terminal, in response to a trigger of handover as determined by the controller based on one of a condition of a signal from the base station and a condition pertaining to the relay station, wherein the condition of the signal from the base station is comparing an intensity of the signal with a predetermined threshold for triggering the handover.

7. The relay station according to claim 1,
wherein the handover is executed based on the condition pertaining to the signal from the base station, indicating the intensity of the signal.

8. The control method according to claim 6,
wherein the handover is executed based on the condition pertaining to the relay station indicating at least one of a position and a time.

9. The control method according to claim 6,
wherein the handover is executed based on the condition pertaining to the signal from the base station, indicating the intensity of the signal.

* * * * *